United States Patent
Yoshida et al.

(10) Patent No.: US 7,923,517 B2
(45) Date of Patent: Apr. 12, 2011

(54) POLYMER MICROPARTICLES AND PRODUCTION METHOD FOR THE SAME

(75) Inventors: Eri Yoshida, Toyohashi (JP); Chiaki Tanaka, Izunokuni (JP)

(73) Assignees: Ricoh Company, Ltd., Tokyo (JP); National University Corporation TOYOHASHI UNIVERSITY OF TECHNOLOGY, Toyohashi-shi (JP)

( * ) Notice: Subject to any disclaimer, the term of this patent is extended or adjusted under 35 U.S.C. 154(b) by 171 days.

(21) Appl. No.: 12/264,643

(22) Filed: Nov. 4, 2008

(65) Prior Publication Data

US 2009/0124789 A1 May 14, 2009

(30) Foreign Application Priority Data

Nov. 9, 2007 (JP) ................................ 2007-291764
Oct. 20, 2008 (JP) ................................ 2008-269500

(51) Int. Cl.
*C08G 77/442* (2006.01)

(52) U.S. Cl. .................... 526/73; 526/218.1; 526/219.1; 526/219.2; 528/25

(58) Field of Classification Search ...................... 528/10
See application file for complete search history.

(56) References Cited

U.S. PATENT DOCUMENTS

| | | | |
|---|---|---|---|
| 5,312,882 A | 5/1994 | DeSimone et al. | |
| 5,552,502 A | 9/1996 | Odell et al. | |
| 5,688,870 A | 11/1997 | Wilkinson et al. | |
| 6,593,439 B1 | 7/2003 | Christian et al. | |
| 7,354,690 B2 | 4/2008 | Ishii et al. | |
| 7,390,607 B2 | 6/2008 | Tanaka et al. | |
| 7,396,625 B2 | 7/2008 | Tanaka et al. | |
| 2007/0031750 A1 | 2/2007 | Tanaka et al. | |

FOREIGN PATENT DOCUMENTS

| | | |
|---|---|---|
| JP | 9-503798 | 4/1997 |
| JP | 10-36680 | 2/1998 |
| JP | 2001-172468 | 6/2001 |
| JP | 2002-179707 | 6/2002 |
| JP | 2002-518558 | 6/2002 |
| JP | 3463952 | 8/2003 |
| JP | 3629215 | 12/2004 |
| JP | 2005-301250 | 10/2005 |
| JP | 2006-30981 | 2/2006 |
| JP | 2007-47752 | 2/2007 |
| JP | 2007-108694 | 4/2007 |
| JP | 2007-108731 | 4/2007 |

OTHER PUBLICATIONS

Aldabbagh et al, "First nitroxide-mediated free radical dispersion polymerizations of styrene in supercritical carbon dioxide" Polymer 46 (2005) 9769-9777.*
Macro Azo initiators, Wako Pure Chemical Industries, 1997.*
U.S. Appl. No. 11/498,787, filed Aug. 4, 2006, Tanaka et al.
Shishido et al, "Supercritical Fluid and Nanotechnology", Yamagata University, 8 pages (with English Translation) Aug. 31, 2004.

* cited by examiner

*Primary Examiner* — Marc S Zimmer
*Assistant Examiner* — Lindsay Nelson
(74) *Attorney, Agent, or Firm* — Oblon, Spivak, McClelland, Maier & Neustadt, L.L.P.

(57) ABSTRACT

A method for producing polymer particles which includes: forming polymer particles by heterogeneous polymerization of a monomer in a supercritical fluid and/or subcritical fluid, wherein a radical polymerization initiator (I) having in a molecular at least a group having radical-generation capability and a group having affinity for the supercritical fluid and/or subcritical fluid, and a radical polymerization initiator (II) are used in combination.

15 Claims, 4 Drawing Sheets

POLYMER MICROPARTICLES AND PRODUCTION METHOD FOR THE SAME

BACKGROUND OF THE INVENTION

1. Field of the Invention

The present invention relates to polymer microparticles prepared by heterogeneous polymerization of a monomer in a supercritical fluid and/or subcritical fluid, and a production method for the same. The polymer microparticles promise to be used as constituent materials of developers in electrophotography, printing inks, building paints, and cosmetics.

2. Description of the Related Art

There have been proposed microparticle production methods that involve heterogeneous polymerization of a monomer in supercritical carbon dioxide, and emulsion polymerization, dispersion polymerization, suspension polymerization, etc., are well known in the art. Among other methods, heterogeneous polymerization conducted in supercritical carbon dioxide is advantageous over conventional heterogeneous polymerization conducted in water or organic solvent, since it can (1) achieve simplification of solvent removal (drying) step after polymerization, (2) requires no waste solvent treatment, and (3) uses no toxic organic solvents. For these reasons, heterogeneous polymerization is widely used for the preparation of microparticles from a monomer, and the resultant microparticles are used for instance in the above-described applications. Nevertheless, many of the conventional preparation methods involving heterogeneous polymerization in supercritical carbon dioxide require surfactant upon granulation; therefore, an optional surfactant need to be prepared in advance for each type of the monomer to be used. When polymer particles are to be prepared from multiple types of monomers by heterogeneous polymerization, different surfactants need to be previously prepared for different types of monomers, requiring multiple devices and resulting in prolonged lead time, increased production steps, and low yields. These disadvantages increase production costs, and therefore, there remains a need in the art to overcome the disadvantages.

Specifically, the first objective in the art was to obtain polymer particles without having to prepare different surfactants for different types of monomers.

The second objective was to improve compatibility between the obtained particles and organic medium, resin, metal, etc. Poor compatibility is attributed to the fact that the obtained particles have substantially smooth surface and are substantially spherical. Thus, there often occurs a situation where polymer particles combined with organic medium for use as a film or paint come off from the medium, a situation where resin or metal covering the particle surface easily come off, and so forth.

To achieve the first objective, Japanese Patent Application Laid-Open (JP-A) No. 2002-179707 discloses a method of preparing submicron resin particles by polymerization of an acrylic monomer while using a polymerization initiator having a polydimethylsiloxane skeleton (product name: VPS-501 (Wako Pure Chemical Industries, Ltd.)) This method, however, is encountered with difficulty in obtaining discrete particles since they undergo flocculation and aggregation. In particular, it has been difficult with this method to obtain micron resin particles since they tend to be flocculated and aggregated extensively. Moreover, polymerization particles obtained with this method generally have a weight-average molecular weight (Mw) of 100,000 to 600,000 and a number-average molecular weight (Mn) of 50,000 to 300,000. Thus, with this method, it has been difficult to obtain low-molecular-weight polymerization particles with a molecular weight of around 3,000 to 50,000 suitable for use as toner or image forming particles. The reason for this is that low-molecular-weight polymerization particles are prone to fluidization due to plasticization by means of supercritical carbon dioxide and thus are more likely to undergo flocculation and aggregation than high-molecular-weight polymerization particles. Namely, it has been very difficult to prepare micron polymerization particles with a low molecular weight without causing flocculation and aggregation.

As another approach to achieve the above first objective, Shishido et al of Yamagata University proposes, on page 152 of their book titled "Supercritical Fluid and Nanotechnology," a method of preparing polymer particles by using, without any surfactant, acrylonitrile as a monomer in which the obtained polymerization particles are insoluble. In this method, however, unwanted particle flocculation occurs due to the absence of surfactant. Moreover, this method is significantly limited in applicability since it is required to exploit the nature of the resultant polymerized particles that they are insoluble in the monomer used; therefore, employable monomers are limited to acrylonitrile, etc, and this method cannot be used for the production of general-purpose polymers such as polystyrene and methyl methacrylate (MMA). U.S. Pat. No. 5,552,502 issued to Odell et al studies on deposition polymerization in supercritical carbon dioxide containing sulfur dioxide. However, sulfur dioxide presents safety problem since it is toxic and corrosive to the device. U.S. Pat. No. 5,688,870 issued to Wilkinson et al tries to prepare particles with improved water dispersibility by preparing resin particles from a polymerizable monomer in supercritical carbon dioxide using a silicone surfactant and by forming a hydrophilic shell layer on the particle surface. However, this method requires in-advance preparation of surfactants, i.e., separate steps for development and preparation of surfactants optimal for the intended type of polymer particles (i.e., monomer types). Thus, it is quite challenge to improve the above-noted production process.

To achieve the second objective attempts have been made to modify particle surface for increased chemical affinity, but have met with limited success. Another possible physical method for obtaining anchor effects on the particle surface is to obtain particles by pulverization. However, pulverization results in generation of particles with a broad particle size distribution—from coarse particles to finely divided particles. This makes classification indispensable, which is undesirable in view of productivity and costs. Also, pulverization may result in too large variations in particle shape.

In-water polycondensation has been contemplated as a method of improving the anchor effect by roughening the particle surfaces for increased specific surface areas. This method, however has disadvantages such as low monomer selectivity and generation of large volumes of waste water.

BRIEF SUMMARY OF THE INVENTION

A first object of the present invention is to provide an efficient method for producing polymer particles in a supercritical fluid and/or subcritical fluid in parallel with a polymer surfactant in a single pot, without having to previously prepare a surfactant according to the type of monomer, and to provide micron polymerized particles with a low molecular weight without causing flocculation and aggregation.

A second object of the present invention is to provide a technology of producing polyhedral microparticles by heterogeneous polymerization using as a solvent a supercritical fluid and/or subcritical fluid.

The foregoing objects aim to increase the anchor effect of the surfaces of particles that are used in any of the foregoing applications, to prevent particle detachment or separation and to increase the adhesion between particles and covering material.

The inventors conducted extensive studies and succeeded in providing a method for producing polymer particles by heterogeneous polymerization of a monomer in a supercritical fluid and/or subcritical fluid, wherein a radical polymerization initiator (I) having in a molecular at least a group having radical-generation capability and a group having affinity for the supercritical fluid and/or subcritical fluid, and a radical polymerization initiator (II) having a structure different from that of the radical polymerization initiator (I) are used in combination with the monomer whereby the necessity of preparation and addition of a surfactant according to the type of the monomer are obviated, and providing micron polymerized particles with a low molecular weight without causing flocculation and aggregation. The underlying mechanism for this is as follows. This method first generates polymer radicals by thermal decomposition of the radical polymerization initiator (I). The radicals are then reacted with the monomer to produce a polymer surfactant that acts on that monomer. This polymer surfactant accelerates formation of polymer particles by heterogeneous polymerization. Specifically, by combining a monomer, radical polymerization initiator (I) and radical polymerization initiator (II), heterogeneous polymerization proceeds in parallel with synthesis of a surfactant that acts on the monomer, whereby polymer particles are obtained.

In this way this approach overcome the forgoing problem pertinent in the art, i.e., eliminated the need of separately preparing surfactants prior to granulation, and made it possible to obtain polyhedral polymer microparticles, which is the second objective described above.

In particular, the inventors found that when a polymer azo-based polymerization initiator having the following General Formula (1) is used as the radical polymerization initiator (I), this optimally results in the formation of polyhedral microparticles.

General Formula (1)

where $R_1$ to $R_5$, $R_7$, and $R_9$ to $R_{12}$ each represent a hydrocarbon group having 1 to 4 carbon atoms; m and n each represent an integer indicating the number of repeating units; and $R_6$ and $R_8$ each 10 represent cyano group.

The present invention has been accomplished based on the discovery of the inventors, and means of solving the foregoing problem are as follows:

<1> A method for producing polymer particles including: forming polymer particles by heterogeneous polymerization of a monomer in a supercritical fluid and/or subcritical fluid, wherein a radical polymerization initiator (I) having in a molecular at least a group having radical-generation capability and a group having affinity for the supercritical fluid and/or subcritical fluid, and a radical polymerization initiator (II) are used in combination, and the radical polymerization initiator (I) has a number-average molecular weight more than 50,000.

<2> The method according to <1>, wherein the supercritical fluid and/or subcritical fluid is supercritical carbon dioxide and/or subcritical carbon dioxide.

<3> The method according to <1> or <2>, wherein the group having affinity for the supercritical fluid and/or subcritical fluid is a group having an organopolysiloxane skeleton.

<4> The method according to any one of <1> to <3>, wherein the group having radical-generation capability is azo group.

<5> The method according to any one of <1> to <4>, wherein the radical polymerization initiator (I) has a number-average molecular weight of 70,000 to 90,000.

<6> The method according to any one of <1> to <5>, wherein the radical polymerization initiator (I) is a polymer azo-based polymerization initiator having an organopolysiloxane skeleton.

<7> The method according to <6>, wherein the polymer azo-based polymerization initiator has a structure in which azo groups and the groups having the organopolysiloxane skeleton are repeatedly bonded together.

<8> The method according to <6> or <7>, wherein the polymer azo-based polymerization initiator has a structure represented by the following General Formula (1):

General Formula (1)

where $R_1$ to $R_5$, $R_7$, and $R_9$ to $R_{12}$ each represent a hydrocarbon group having 1 to 4 carbon atoms; m and n each represent an integer indicating the number of repeating units; and $R_6$ and $R_8$ each represent cyano group.

<9> The method according to <8>, wherein in General Formula (1) m represents an integer of 50 to 200, and n represents an integer of 3 to 15.

<10> The method according to any one of <1> to <9>, wherein the radical polymerization initiator (II) is an azo-based initiator.

<11> The method according to any one of <1> to <10>, wherein the monomer contains an aromatic vinyl monomer and/or a derivative thereof.

<12> Polymer particles obtained by the method according to any one of <1> to <11>.

<13> The polymer particles according to <12>, wherein the polymer particles are polyhedral polymer particles.

The present invention can provide polymer particles with diameters of several micrometers offering a uniform particle size distribution and a production method for the same, by heterogeneous polymerization of a monomer in a supercritical fluid and/or subcritical fluid by using in combination a radical polymerization initiator (I) having in a molecular at least a group having radical-generation capability and a group having affinity for the supercritical fluid and/or subcritical fluid, and a radical polymerization initiator (II).

DETAILED DESCRIPTION OF THE INVENTION

Hereinafter, the inventive polymer particles and production method for the same will be described in more detail with reference to specific embodiments, which however shall not be construed as limiting the scope of the present invention. It should be understood that any modification, alteration, and substitution can be anticipated and expected from those skilled in the art without departing from the teachings of the present invention.

(Production Method for Polymer Particles)

The inventive production method for polymer particles uses a radical polymerization initiator (I) having in a molecular at least a group having radical-generation capability and a group having affinity for a supercritical fluid and/or subcritical fluid, and a radical polymerization initiator (II).

<Radical Polymerization Initiator (I)>

Radical polymerization initiator (I) includes in a molecular at least a group having radical-generation capability and a group having affinity for a supercritical fluid and/or subcritical fluid (e.g., supercritical carbon dioxide).

Examples of the group having affinity for a supercritical fluid and/or subcritical fluid (e.g., supercritical carbon dioxide) include, for example, groups having an organopolysiloxane skeleton, and examples thereof include, for example, linear- or branched-polydimethylsiloxane groups, which encompass modified polydimethylsiloxane groups partially substituted with alkyl and/or phenyl groups.

Additional examples of the group having affinity for a supercritical fluid and/or subcritical fluid (e.g., supercritical carbon dioxide) include, for example, linear-or branched-perfluoroalkyl groups, which encompass modified perfluoroalkyl groups partially substituted with alkyl and/or phenyl groups, dialkyl ether groups, alkyl groups having 1 to 20 carbon atoms partially substituted with halogens such as fluorine and/or chlorine atoms, trimethylsiloxane group, fluoromethyl group, difluoromethyl group, trifluoromethyl group, chloromethyl group, dichloromethyl group, trichloromethyl group, fluorine group, chlorine group, bromine group, and iodine group. Among them, polydimethylsiloxane groups and perfluoroalkyl groups are preferably, with polydimethylsiloxane groups more preferably in view of their low environmental loads and costs.

Examples of the group having radical-generation capability include, for example, azo group, peroxide group, and hydroperoxide group.

Preferably, radical polymerization initiator (I), or polymer surfactant precursor, is a polymer azo-based polymerization initiator having the following General Formula (1):

General Formula (1)

where $R_1$ to $R_5$, $R_7$, and $R_9$ to $R_{12}$ each represent a hydrocarbon group having 1 to 4 carbon atoms; m and n each represent an integer indicating the number of repeating units; and $R_6$ and $R_8$ each represent cyano group.

In General Formula (1), m represents an integer of 50 to 200, preferably 100 or more, and more preferably 135; and n represents an integer of 3 to 15, preferably 5 or more, and more preferably 7 to 9.

Moreover, examples of $R_1$ to $R_5$ and $R_7$ include, for example, methyl group, ethyl group, n-propyl group, i-propyl group, n-butyl group, sec-butyl group, tert-butyl group, and substituted or non-substituted phenyl group. Examples of $R_9$ to $R_{12}$ include, for example, methylene group, ethylene group, propylene group, and butylene group. In particular, it is preferable to employ a compound in which $R_1$ to $R_5$ and $R_7$ are methyl group, $R_6$ and $R_8$ are cyano group, $R_9$ and $R_{10}$ are methylene group, and $R_{11}$ and $R_{12}$ are prolylene group.

The most preferable example of the radical polymerization initiator (I) is VPS-1001, a polymer azo-based polymerization initiator available from Wako Pure Chemical Industries, Ltd. This polymer azo-based polymerization initiator corresponds to a compound having the above General Formula (I) wherein m is an integer of 135, number-average molecular weight is 70,000 to 90,000, molecular weight of polydimethylsiloxane moiety is about 10,000, and number of moles of azo group per 1 g of VPS-1001 is about 0.09 mmol/g.

As an analogue of VPS-1001, VPS-501 is available from Wako Pure Chemical Industries, Ltd, which corresponds to a compound having General Formula (1) wherein m is an integer of 68, number-average molecular weight is 30,000 to 50,000, and molecular weight of polydimethylsiloxane moiety is about 5,000. However, VPS-501 cannot produce micron polymer particles with a low molecular weight without causing flocculation and aggregation.

The reason for this is that since the molecular chain of the polydimethylsiloxane moiety of VPS-501 is shorter than that of VPS-1001 and the molecular weight of the polymer azo-based polymerization initiator itself is small, VPS-501 offers poor surface activity (dispersivity as dispersive resin) upon dispersion polymerization, causing flocculation and aggregation of resultant polymer particles.

For this reason, it is preferable to employ VPS-1001 having a long polydimethylsiloxane chain as the polymer azo-based polymerization initiator. When VPS-501 is used, micron polymer particles with a low molecular weight cannot be obtained, and in addition, polyhedral polymer particles cannot be obtained.

Thus, the radical polymerization initiator (I) used in the present invention preferably has a number-average molecular weight more than 50,000. The upper limit of the number-average molecular weight of the radical polymerization initiator (I) is not particularly limited, so long as the radical polymerization initiator (I) can dissolve in super-/sub-critical fluid or a monomer to such an extent that it can at least serve as a polymerization initiator for the monomer in the super-critical fluid and/or subcritical fluid. Preferably, it has a number-average molecular weight of 70,000 to 90,000.

The azo group moieties of the main chain of the radical polymerization initiator (I) having General Formula (1) are decomposed during heterogeneous polymerization of a monomer in super-/sub-critical fluid, forming a block copolymer in which polymers composed of the monomer are bonded to the decomposition sites. The block copolymer surrounds the insoluble polymer, formed by heterogeneous polymerization of the monomer, for stabilization. In this way polyhedral polymer particles are formed.

Figure 4:
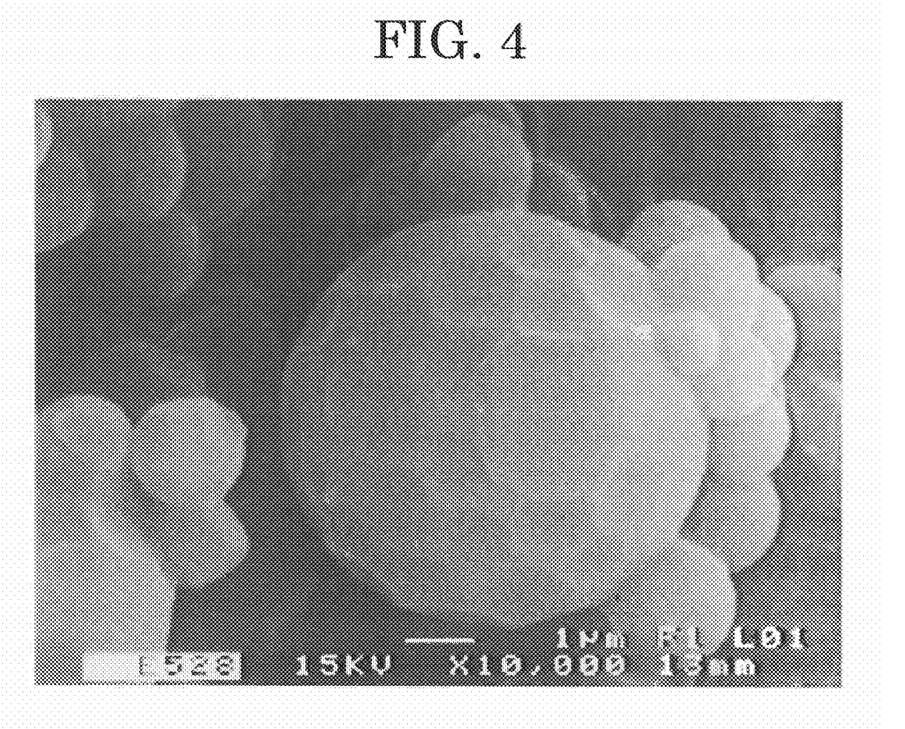
FIG. 4 is a scanning electron microscope image of polyhedral polymer particles obtained in Example 1.

When the polymer particles surrounded by polydimethylsiloxane segments of the block copolymer undergo rapid pressure reduction, polydimethylsiloxane segments with low glass transition points are firmly bonded together. Thus it is contemplated that formation of roughened polyhedral polymer particles is favored over formation of spherical polymer particles with smooth surface. As used herein "polyhedral polymer particles" refer to particles obtained by forming multiple flat and concave portions on spherical particles As a specific example, particles as shown in the SEM image of FIG. 4 can be exemplified.

<Radical Polymerization Initiator (II)>

Radical polymerization initiator (II) encompasses azo-based initiators, peroxides, transition metal derivative-based initiators, transition metal-organic haloid-based initiators, and photo-initiators. It is preferable to employ an azo-based initiator or peroxide having a 10-hour half-life temperature within 40° C. to 100° C.

Examples of radical polymerization initiator (II) include, for example, azo-based initiators such as azobisisobutylonitrile, 2,2'-azobis(2,4-dimethylvaleronitrile), and 1,1'-azobis(cyclohexane-1-carbonitrile); and peroxides such as lauryl peroxide, benzoyl peroxide, tert-butyl peroctoate, methyl ethyl ketone peroxide, isopropyl peroxycarbonate, cumen hydroperoxide, 2,4-dichlorobenzoyl peroxide, and potassium persulfate, or these peroxides combined with sodium thiosulfate, amine, etc.

<Monomer>

As monomers used for production of inventive polymer particles, a large variety of radical polymerizable monomers can be used.

Examples of such monomers include, for example, aromatic vinyl monomers, ethylenically unsaturated nitrile monomers, ethylenically unsaturated carboxylic acid ester monomers, conjugated diene monomers, ethylenically unsaturated carboxyli acid amide monomers, ethylenically unsaturated carboxylic acid monomers, carboxylic vinyl ester monomers, and halogenated vinyl monomers. Among them, aromatic vinyl monomers are preferably, and styrene monomers and derivatives thereof are more preferable.

Examples of the aromatic vinyl monomers include, for example, styrene, vinylbenzyl chloride, o-chlorostyrene, m-chlorostyrene, p-chlorostyrene, o-methylstyrene, m-methylstyrene, p-methylstyrene, hydroxymethylstyrene, and p-cyanostyrene.

Examples of the ethylenically unsaturated nitrile monomer include, for example, acrylonitrile and methacrylonitrile.

Examples of the ethylenically unsaturated carboxylic acid ester monomers include, for example, methyl methacrylate, 2-hydroxyethyl methacrylate, methyl α-cyanoacrylate, glycidyl methacrylate, and 2-dimethylaminoethyl acrylate.

Examples of the conjugated diene monomers include, for example, 1,3-butadiene, isoprene, and chloroprene.

Examples of the ethylenically unsaturated carboxylic acid amide monomers include, for example, methacrylamide, acrylamide, isopropylacrylamide, and maleimide.

Examples of the ethylenically unsaturated carboxylic acid monomers include, for example, methacrylic acid, acrylic acid, and crotonic acid.

A representative example of the carboxylic acid ester monomer is vinyl acetate, and a representative example of the halogenated vinyl monomer is vinyl chloride. These monomers may be used in combination.

Upon production of inventive polymer particles, it is preferable to use radical polymerization initiator (II) in an amount of 0.005 mol to 0.05 mol, more preferably 0.01 mol to 0.03 mol, per 1 mol of total monomer.

Upon production of inventive polymer particles, it is preferable to use a surfactant precursor having General Formula (1) in an amount of 0.5 parts by mass to 10 parts by mass, more preferably 2 parts by mass to 8 parts by mass, per 100 parts by mass of a monomer.

Upon production of inventive polymer particles, it is preferable to use a monomer in a volume of 5 parts by volume to 50 parts by volume, more preferably 10 parts by volume to 30 parts by volume, per 100 parts by volume of a high-pressure cell used as a reaction vessel during the production process.

In the inventive production method, the temperature of the high-pressure cell or reaction vessel is 40° C. to 80° C., more preferably 55° C. to 70° C. If the temperature is below 40° C., it results in low polymerization rate and thus in prolonged polymerization time. If the temperature is above 80° C., it becomes necessary to apply extremely high pressure and thus a heavy load is undesirably placed on the cell. It is preferable to keep the cell pressure at 20 MPa to 50 Mpa, more preferably to 30 MPa to 40 MPa. If the cell pressure is below 20 MPa, precipitates result during polymerization, making resultant particles irregular in shape. If the cell pressure is above 50 MPa, a heavy load is undesirably placed on the cell. The stirring speed during polymerization is 100 rpm to 900 rpm, more preferably 200 rpm to 800 rpm. If the stirring speed is below 100 rpm or above 900 rpm, it undesirably results in particle flocculation.

The number-average molecular weight (Mn) of the polymer obtained with the inventive production method is often about 5,000 to 8,000, and molecular weight distribution (Mw/Mn) is 2.0 to 2.5.

The particle diameters of polymer particles (polyhedral particles) obtained with the inventive production method can be adjusted to fall within 1 μm to 4 μm, and polydispersivity thereof is 1.2 to 2.9. Thus the polymer particles (polyhedral particles) have uniform particle diameters.

EXAMPLES

Figure 1:
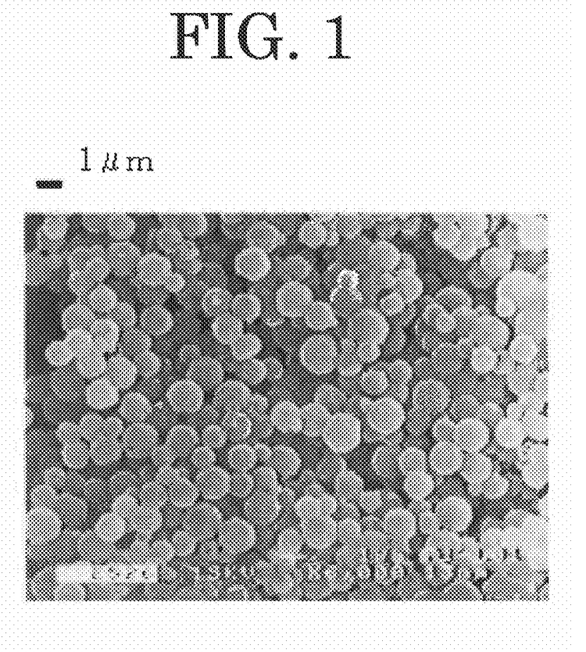
FIG. 1 is a scanning electron microscope image of particles obtained in Example 1.

A commercially available styrene monomer was washed with a 5 wt % aqueous sodium hydroxide solution, and a radical polymerization inhibitor was removed by reduced-pressure distillation. While stirring the purified styrene monomer with a stirrer, it was bubbled with nitrogen gas for 15 minutes to remove oxygen therefrom. 2.2 mL of the purified styrene monomer subjected to deoxidization was then added to 100 mg of a polymer azo-based polymerization initiator (VPS-1001, Wako Pure Chemical Industries, Ltd.), and stirred at room temperature until the polymer azo-based polymerization initiator was completely dissolved. A high-pressure cell with an inner volume of 10 mL was purged with nitrogen gas for removal of oxygen, 95 mg of azobisisobutylonitrile (Wako Pure Chemical Industries, Ltd.) and the above styrene solution of polymer azo-based polymerization initiator were added in the cell, and the cell was sealed hermetically. Subsequently, carbon dioxide which had been liquidized by a double plunger pump equipped with a cooler was fed into the cell to a cell pressure of about 18 MPa at 35° C., and then the valve was closed. After heating the cell to 65° C., liquidized carbon dioxide was again fed into the cell to a cell pressure of 40 MPa. Reaction was effected at 65° C. for 24 hours under stirring at 300 rpm. Thereafter, the cell was cooled to room temperature, and carbon dioxide was gradually discharged until the cell pressure reached to normal pressure. In this way particles were obtained in the form of while powder. The obtained particles had a number-average molecular weight (Mn) of 7,140 and a molecular weight distribution (Mw/Mn) of 2.17. FIG. 1 shows an SEM image of the particles. The particle diameter (Dn) was 1.02 μm and dispersivity (Dw/Dn) was 1.20.

<Molecular Weight Measurement by GPC>

Molecular weight measurement of resin was carried out by gel permeation chromatography (GPC) under the following condition:
Instrument: GPC-8020 (Tosoh Corporation)
Column: TSK G2000H$_{XL}$, and G4000H$_{XL}$ (Tosoh Corporation)
Temperature: 40° C.
Solvent: THF (tetrahydrofuran)
Flow rate: 1.0 ml/min
Sample: 1 mL (conc.=0.5%)

A calibration curved was then prepared using monodispersed styrene standard samples. Thereafter, the number-average molecular weight (Mn) and weight-average molecular weight (Mw) of obtained toner were calculated from the distributions.

<Measurement of Dispersivity>

For calculation of dispersivity of particle diameter, 100 particle images were randomly sampled from an SEM image, their diameters were measured, and dispersivity was calculated using the following equation:

Dispersivity: $Dw/Dn = \Sigma Di^4 / \Sigma Di^3$ where D denotes particle diameter Comparative Example 1

Figure 2:
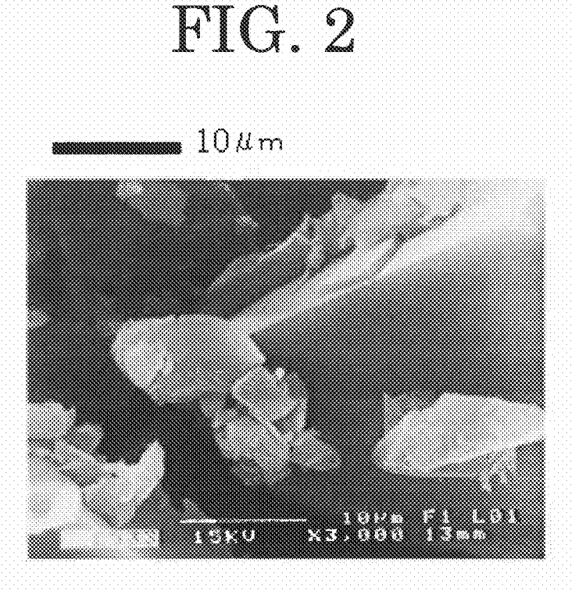
FIG. 2 is a scanning electron microscope image of particles obtained in Comparative Example 1.

Polymer particles of Comparative Example 1 were prepared as in Example 1 except that the polymer azo-based initiator VPS-1001 (Wako Pure Chemical Industries, Ltd.) was not added. The obtained polymer particles had irregular shape (FIG. 2).

Comparative Example 2

Polymer particles of Comparative Example 2 were prepared as in Example 1 except that azobisisobutylnitrile was not added. Polymerization hardly occurred and observation of the obtained polymer particles failed since they were dissolved in unreacted styrene monomers.

Comparative Example 3

Polymer particles of Comparative Example 3 were prepared as in Example 1 except that a homopolymer of dimethylsiloxane (number-average molecular weight (Mn)=46,000, molecular weight distribution (Mw/Mn)=1.96) was used instead of VPS-1001. The obtained polymer particles had irregular shape.

Figure 3A:
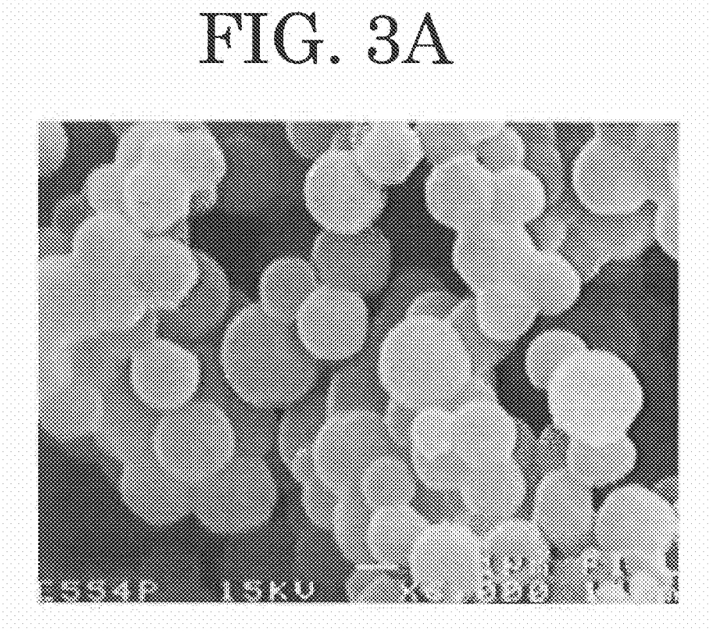
FIG. 3A is a scanning electron microscope image of particles obtained in Example 2 (stirring speed=700 rpm).
Figure 3B:
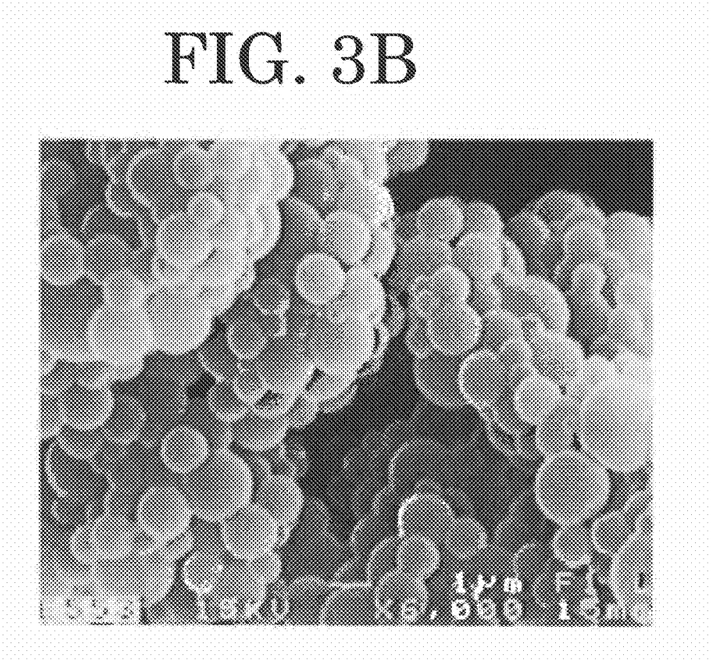
FIG. 3B is a scanning electron microscope image of particles obtained in Example 2 (stirring speed=1,000 rpm).

To study how stirring speed influences the generation of polymer particles, polymer particles were prepared at different stirring speeds (700 rpm and 1,000 rpm) under the same condition as in Example 1. The polymer particles prepared at a stirring speed of 700 rpm had a number-average molecular weight (Mn) of 7,990, molecular weight distribution (Mw/Mn) of 2.04, particle diameter (Dn) of 1.65 μm, and dispersivity (Dw/Dn) of 1.99. The polymer particles prepared at a stirring speed of 1,000 rpm had a number-average molecular weight (Mn) of 8,470, molecular weight distribution (Mw/Mn) of 1.96, particle diameter (Dn) of 1.13 μm, and dispersivity (Dw/Dn) of 2.70. At 1,000 rpm, particle aggregation was observed. FIG. 3A shows an SEM image of the polymer particles prepared at a stirring speed of 700 rpm, and FIG. 3B shows an SEM image of he polymer particles prepared at a stirring speed of 1,000 rpm.

Example 3

After washing a commercially available 4-chlorostyrene monomer with 5 wt % aqueous sodium hydroxide solution, a radical polymerization inhibitor was removed by reduced-pressure distillation. While stirring the purified 4-chlorostyrene monomer with a stirrer, it was bubbled with nitrogen gas for 15 minutes for oxygen removal therefrom. 2.2 mL of the purified 4-chlorostyrene monomer subjected to deoxidization was then added to a polymer azo-based polymerization initiator (VPS-1001, Wako Pure Chemical Industries, Ltd.) to a concentration of 4 wt %, and stirred at room temperature until the polymer azo-based polymerization initiator was homogenously dispersed. A high-pressure cell with an inner volume of 10 mL was purged with nitrogen gas for removal of oxygen, 0.263M of azobisisobutylonitrile and the above 4-chlorostyrene solution of polymer azo-based polymerization initiator were added in the cell, and the cell was sealed hermetically. Subsequently, carbon dioxide which had been liquidized by a double plunger pump equipped with a cooler was fed into the cell to a cell pressure of about 18 MPa at 35° C., and then the valve was closed. After heating the cell to 65° C., liquidized carbon dioxide was again fed into the cell to a cell pressure of 40 MPa. Reaction was effected at 65° C. for 24 hours under stirring at 300 rpm. Thereafter, the cell was cooled to room temperature, and carbon dioxide was gradually discharged until the cell pressure reached to normal pressure. In this way particles were obtained in the form of while powder. The obtained particles had a number-average molecular weight (Mn) of 46,400 and a molecular weight distribution (Mw/Mn) of 3.49. The particle diameter (Dn) was 1.53 μm and dispersivity (Dw/Dn) was 2.31.

Example 4

Polymer particles of Example 4 were prepared as in Example 1 except that the reaction temperature was changed to 55° C. The obtained polymer particles had a number-average molecular weight (Mn) of 16,300, molecular weight distribution (Mw/Mn) of 2.71, particle diameter (Dn) of 1.34 μm, and dispersivity (Dw/Dn) of 2.45.

Examples 5 to 7

Polymer particles of Examples 5 to 7 were respectively prepared as in Example 1 except that the added amount of the polymer azo-based initiator VPS-1001 was changed as shown in Table 1, which also lists the physical properties of the obtained polymer particles.

TABLE 1

|  | VPS-1001 | Dn (μm) | Dw/Dn | Mn | Mw/Mn |
| --- | --- | --- | --- | --- | --- |
| Ex. 5 | 51 mg | 1.06 | 2.60 | 7060 | 2.25 |
| Ex. 6 | 25 mg | 2.06 | 2.37 | 6580 | 2.45 |
| Ex. 7 | 13 mg | 3.96 | 2.84 | 5900 | 2.48 |

Comparative Example 4

Figure 5:
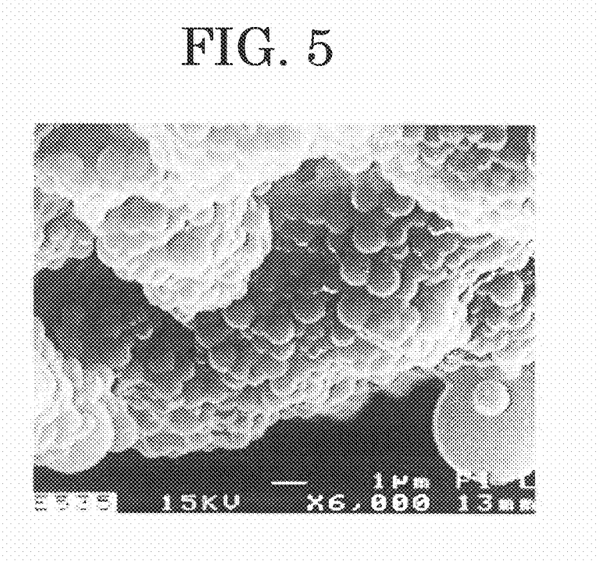
FIG. 5 is a scanning electron microscope image of particles obtained in Comparative Example 4.

Polymer particles of Comparative Example 4 were prepared as in Example 1 except that the polymer azo-based polymerization initiator VPS-501 was used instead of the polymer azo-based polymerization initiator VPS-1001. The obtained polymer particles had a number-average molecular weight (Mn) of 7,020, molecular weight distribution (Mw/Mn) of 2.31, particle diameter (Dn) of 0.805 µm, and dispersivity (Dw/Dn) of 1.20. However, the particles were flocculated and aggregated and thus could not be taken out as discrete particles. FIG. 5 shows an SEM image of the polymer particles.

Comparative Example 5

Figure 6:
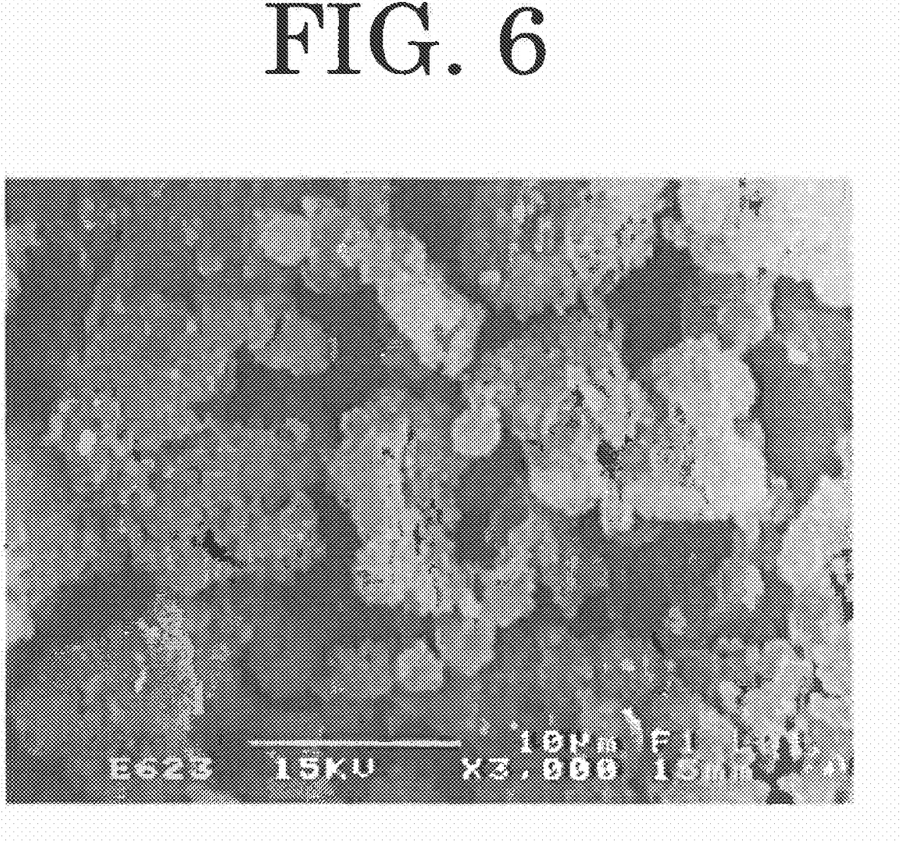
FIG. 6 is a scanning electron microscope image of particles obtained in Comparative Example 5.

Polymer particles of Comparative Example 5 were prepared as in Example 1 except that methyl methacrylate monomer was used instead of styrene monomer and that the polymer azo-based polymerization initiator VPS-501 was used instead of the polymer azo-based polymerization initiator VPS-1001. The obtained polymer particles had a number-average molecular weight (Mn) of 21,800 and molecular weight distribution (Mw/Mn) of 2.09. However, the particles were flocculated and aggregated and thus could not be taken out as discrete particles. FIG. 6 shows an SEM image of the polymer particles.

What is claimed is:

1. A method for producing polyhedral polymer particles comprising:
   forming polymer particles by heterogeneous polymerization of a monomer in a supercritical fluid and/or subcritical fluid,
   wherein a radical polymerization initiator (I) having in a molecule at least a group having radical-generation capability and a group having affinity for the supercritical fluid and/or subcritical fluid, and a radical polymerization initiator (II) are used in combination, and the radical polymerization initiator (I) has a number-average molecular weight more than 50,000.

2. The method according to claim 1, wherein the supercritical fluid and/or subcritical fluid is supercritical carbon dioxide and/or subcritical carbon dioxide.

3. The method according to claim 1, wherein the group having affinity for the supercritical fluid and/or subcritical fluid is a group having an organopolysiloxane skeleton.

4. The method according to claim 1, wherein the group having radical-generation capability is azo group.

5. The method according to claim 1, wherein the radical polymerization initiator (I) has a number-average molecular weight of 70,000 to 90,000.

6. The method according to claim 1, wherein the radical polymerization initiator (I) is a polymer azo-based polymerization initiator having an organopolysiloxane skeleton.

7. The method according to claim 6, wherein the polymer azo-based polymerization initiator has a structure in which azo groups and the groups having the organopolysiloxane skeleton are repeatedly bonded together.

8. The method according to claim 6, wherein the polymer azo-based polymerization initiator has a structure represented by the following General Formula (1):

General Formula (1)

where $R_1$ to $R_5$, $R_7$, and $R_9$ to $R_{12}$ each represent a hydrocarbon group having 1 to 4 carbon atoms; m and n each represent an integer indicating the number of repeating units; and $R_6$ and $R_8$ each represent cyano group.

9. The method according to claim 8, wherein in General Formula (1) m represents an integer of 50 to 200, and n represents an integer of 3 to 15.

10. The method according to claim 1, wherein the radical polymerization initiator (II) is an azo-based initiator.

11. The method according to claim 1, wherein the monomer contains an aromatic vinyl monomer and/or a derivative thereof.

12. Polyhedral polymer particles obtained by a method for producing polyhedral polymer particles, which method comprises forming polymer particles by heterogeneous polymerization of a monomer in a supercritical fluid and/or subcritical fluid, wherein a radical polymerization initiator (I) having in a molecule at least a group having radical-generation capability and a group having affinity for the supercritical fluid and/or subcritical fluid, and a radical polymerization initiator (II) are used in combination.

13. The method according to claim 1, wherein the heterogeneous polymerization is performed at temperature in the range of 40° C. to 80° C.

14. The polyhedral polymer particles according to claim 12, wherein the polymer particles have a particle diameter of from 1 µm to 4 µm.

15. The polyhedral polymer particles according to claim 12, wherein the radical polymerization initiator (I) has a number-average molecular weight more than 50,000.

* * * * *